United States Patent
Blankenship

(10) Patent No.: US 8,448,375 B1
(45) Date of Patent: May 28, 2013

(54) FISHING APPARATUS

(76) Inventor: Michael Glen Blankenship, New Hope, AL (US)

(*) Notice: Subject to any disclaimer, the term of this patent is extended or adjusted under 35 U.S.C. 154(b) by 376 days.

(21) Appl. No.: 12/755,936

(22) Filed: Apr. 7, 2010

Related U.S. Application Data

(60) Provisional application No. 61/214,630, filed on Apr. 27, 2009.

(51) Int. Cl.
*A01K 93/00* (2006.01)
*A01K 91/06* (2006.01)

(52) U.S. Cl.
USPC .............. 43/19.2; 43/26.1; 43/43.1; 43/43.13

(58) Field of Classification Search
USPC ................ 43/43.1, 43.13, 44.87, 44.88, 19.2, 43/26.1, 15
See application file for complete search history.

(56) References Cited

U.S. PATENT DOCUMENTS

| | | | | |
|---|---|---|---|---|
| 270,358 A | * | 1/1883 | Aldrich | 43/17 |
| 788,047 A | * | 4/1905 | Holz et al. | 43/26.1 |
| 798,344 A | * | 8/1905 | Holz et al. | 43/43.1 |
| 885,627 A | * | 4/1908 | Loehr | 43/43.13 |
| 1,193,684 A | * | 8/1916 | Gregory et al. | 43/44.92 |
| 1,251,810 A | * | 1/1918 | Oehler | 43/26.1 |
| 1,410,817 A | * | 3/1922 | Lloyd | 43/17 |
| 1,670,184 A | * | 5/1928 | Bond | 43/43.13 |
| 1,707,901 A | * | 4/1929 | Bubb et al. | 43/17 |
| 1,749,464 A | * | 3/1930 | Bond | 43/43.13 |
| 1,759,381 A | * | 5/1930 | West | 43/17 |
| 1,866,864 A | * | 7/1932 | Schroeder | 43/15 |
| 2,122,836 A | * | 7/1938 | Gegerfeldt | 43/19.2 |
| 2,181,458 A | * | 11/1939 | La Gue | 43/44.87 |
| 2,425,590 A | * | 8/1947 | Bidwell | 43/17 |
| 2,490,669 A | * | 12/1949 | Burke | 43/17 |
| 2,521,852 A | * | 9/1950 | Jones | 43/43.13 |

(Continued)

FOREIGN PATENT DOCUMENTS

| | | | |
|---|---|---|---|
| DE | 3501553 A1 | * | 7/1986 |
| DE | 3522381 A1 | * | 1/1987 |

(Continued)

OTHER PUBLICATIONS

Big Ten Tackle: Bobber With a Brain Detail Page, 8 pages, found at http://www.bigtentackle.com/bt/detbwab.htm, printed on Aug. 5, 2009.

*Primary Examiner* — Darren W Ark
(74) *Attorney, Agent, or Firm* — Ann I. Dennen; Lanier Ford Shaver & Payne, P.C.

(57) ABSTRACT

The present disclosure is a bobber that has a front hollow cavity, a rear hollow cavity, and a middle hollow cavity separating the front cavity from the rear cavity, the middle hollow cavity having a first opening in a top portion of the middle hollow cavity and a second opening in a bottom portion of the middle hollow cavity. In addition, the bobber has an arm comprising a first end and a second end, the arm extending through the first opening and the second opening and fixedly connected to the middle hollow cavity, the arm attached at a first end to fishing line such that when water pressure is applied to the second end of the arm extending from the second opening the arm moves vertically causing bait attached to the fishing line to move vertically in a body of water.

3 Claims, 4 Drawing Sheets

U.S. PATENT DOCUMENTS

| | | | | | |
|---|---|---|---|---|---|
| 2,530,100 | A | * | 11/1950 | Vanderpool, Jr. | 43/17 |
| 2,534,709 | A | * | 12/1950 | Goertzen | 43/17 |
| 2,534,795 | A | * | 12/1950 | Ramsey | 43/15 |
| 2,545,385 | A | * | 3/1951 | Reppert et al. | 43/15 |
| 2,547,308 | A | * | 4/1951 | Dean | 43/17 |
| 2,564,426 | A | * | 8/1951 | Curtiss | 43/44.88 |
| 2,575,852 | A | * | 11/1951 | Trowbridge | 43/16 |
| 2,587,190 | A | * | 2/1952 | Merriweather | 43/17 |
| 2,597,737 | A | * | 5/1952 | Kay et al. | 43/44.88 |
| 2,609,634 | A | * | 9/1952 | Simpson | 43/44.88 |
| 2,643,478 | A | * | 6/1953 | Paulsen | 43/19.2 |
| 2,694,875 | A | * | 11/1954 | Hoffmann | 43/15 |
| 2,758,407 | A | | 8/1956 | Speidell | |
| 2,787,856 | A | * | 4/1957 | Jones | 43/15 |
| 2,801,487 | A | * | 8/1957 | Morgan | 43/15 |
| 2,803,914 | A | * | 8/1957 | Ellis | 43/26.1 |
| 2,804,712 | A | * | 9/1957 | Jackson | 43/26.1 |
| 2,876,578 | A | * | 3/1959 | Argenio | 43/15 |
| 2,937,469 | A | * | 5/1960 | Tiede | 43/44.88 |
| 3,001,313 | A | * | 9/1961 | Long | 43/43.1 |
| 3,007,432 | A | * | 11/1961 | Still | 43/26.1 |
| 3,099,099 | A | * | 7/1963 | Cahen et al. | 43/43.13 |
| 3,149,435 | A | * | 9/1964 | Nordeen | 43/26.1 |
| 3,192,661 | A | * | 7/1965 | Tyrrell | 43/44.88 |
| 3,203,131 | A | | 8/1965 | Myers | |
| 3,346,987 | A | | 10/1967 | Cornwell | |
| 3,394,484 | A | | 7/1968 | Sonoski | |
| 3,422,561 | A | * | 1/1969 | McLean | 43/19.2 |
| 3,481,064 | A | * | 12/1969 | Newman | 43/4 |
| 3,599,369 | A | * | 8/1971 | Carlson | 43/19.2 |
| 3,618,254 | A | * | 11/1971 | Myers | 43/43.13 |
| 3,623,259 | A | * | 11/1971 | Rode | 43/19.2 |
| 3,645,030 | A | * | 2/1972 | Milburn, Jr. | 43/26.1 |
| 3,750,324 | A | * | 8/1973 | Verheij | 43/44.88 |
| 3,758,975 | A | * | 9/1973 | Curtis | 43/26.1 |
| 3,832,795 | A | * | 9/1974 | Wolfe | 43/17 |
| 3,898,759 | A | * | 8/1975 | Jensen | 43/43.13 |
| 4,033,062 | A | * | 7/1977 | Denecky | 43/19.2 |
| 4,077,149 | A | | 3/1978 | Enquist | |
| 4,139,960 | A | * | 2/1979 | Chojnowski | 43/15 |
| 4,199,889 | A | * | 4/1980 | Van Orden et al. | 43/44.88 |
| 4,204,356 | A | * | 5/1980 | Smith | 43/43.13 |
| 4,282,672 | A | * | 8/1981 | Neary | 43/43.13 |
| 4,310,983 | A | * | 1/1982 | Irvin et al. | 43/19.2 |
| 4,357,775 | A | * | 11/1982 | Click | 43/43.1 |
| 4,509,287 | A | | 4/1985 | Hood | |
| 4,561,206 | A | * | 12/1985 | Lowrance et al. | 43/43.11 |
| 4,567,686 | A | | 2/1986 | Akom | |
| 4,638,585 | A | | 1/1987 | Korte | |
| 4,642,932 | A | * | 2/1987 | Austin | 43/27.2 |
| 4,748,764 | A | | 6/1988 | Hammons | |
| 4,757,635 | A | * | 7/1988 | Cole | 43/44.88 |
| 4,798,021 | A | | 1/1989 | Miklos | |
| 5,005,310 | A | * | 4/1991 | Rinehart | 43/44.88 |
| 5,016,385 | A | * | 5/1991 | Blease | 43/26.1 |
| 5,068,995 | A | * | 12/1991 | Rinehart | 43/17 |
| 5,077,929 | A | * | 1/1992 | Khan | 43/26.1 |
| 5,111,609 | A | * | 5/1992 | Flo | 43/26.1 |
| 5,142,812 | A | * | 9/1992 | Borden | 43/43.13 |
| 5,231,784 | A | * | 8/1993 | Condusta | 43/19.2 |
| 5,276,994 | A | * | 1/1994 | Thompson et al. | 43/43.13 |
| 5,404,669 | A | * | 4/1995 | Johnson | 43/44.88 |
| 5,412,898 | A | * | 5/1995 | Crain | 43/19.2 |
| 5,595,013 | A | | 1/1997 | Dubriske | |
| 5,867,932 | A | | 2/1999 | Reiger | |
| 5,937,565 | A | | 8/1999 | Maric et al. | |
| 6,021,596 | A | * | 2/2000 | Heuke | 43/19.2 |
| 6,247,263 | B1 | * | 6/2001 | Tiede et al. | 43/44.88 |
| 6,493,981 | B2 | * | 12/2002 | Izzard | 43/15 |
| 6,796,076 | B1 | * | 9/2004 | Bennett | 43/16 |
| 6,817,136 | B2 | * | 11/2004 | Novak | 43/19.2 |
| 6,836,993 | B1 | * | 1/2005 | Austin | 43/4 |
| 7,065,918 | B2 | * | 6/2006 | Leone | 43/43.13 |
| 7,131,231 | B1 | * | 11/2006 | Lee | 43/17 |
| 7,441,509 | B2 | * | 10/2008 | Piska | 43/26.1 |
| 7,596,901 | B1 | * | 10/2009 | Johnson | 43/43.1 |
| 7,849,629 | B1 | * | 12/2010 | Adcock | 43/15 |
| 7,971,385 | B2 | * | 7/2011 | Woodhouse et al. | 43/26.1 |
| 2008/0276522 | A1 | * | 11/2008 | Roh | 43/43.13 |
| 2008/0313949 | A1 | * | 12/2008 | Lee | 43/43.13 |
| 2010/0122487 | A1 | * | 5/2010 | Snider | 43/19.2 |
| 2011/0138675 | A1 | * | 6/2011 | Cutts | 43/26.1 |
| 2011/0232155 | A1 | * | 9/2011 | Throssell | 43/19.2 |

FOREIGN PATENT DOCUMENTS

| | | | |
|---|---|---|---|
| DE | 3611272 C1 | * | 5/1987 |
| DE | 19836255 A1 | * | 2/2000 |
| EP | 1005790 A1 | * | 6/2000 |
| EP | 1038439 A1 | * | 9/2000 |
| FR | 2767640 A1 | * | 3/1999 |
| FR | 2804284 A1 | * | 8/2001 |
| GB | 2098042 A | * | 11/1982 |
| GB | 2206021 A | * | 12/1988 |
| GB | 2280830 A | * | 2/1995 |
| GB | 2295529 A | * | 6/1996 |
| GB | 2333682 A | * | 8/1999 |
| GB | 2366172 A | * | 3/2002 |
| GR | 1004068 | | 11/2002 |
| JP | 03175923 A | * | 7/1991 |
| JP | 07255342 A | * | 10/1995 |
| JP | 10286050 A | * | 10/1998 |
| JP | 2002315484 A | * | 10/2002 |
| JP | 2004329036 A | * | 11/2004 |
| JP | 2006042639 A | * | 2/2006 |
| JP | 2008092809 A | * | 4/2008 |
| JP | 2010239959 A | * | 10/2010 |
| WO | WO 9300802 A1 | * | 1/1993 |
| WO | WO 2007126323 A1 | * | 11/2007 |

* cited by examiner

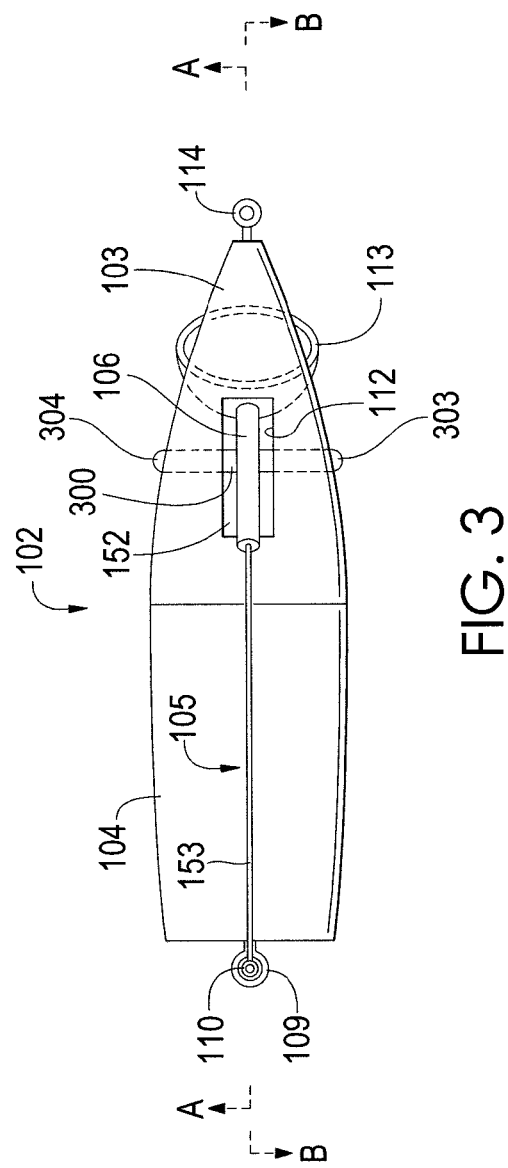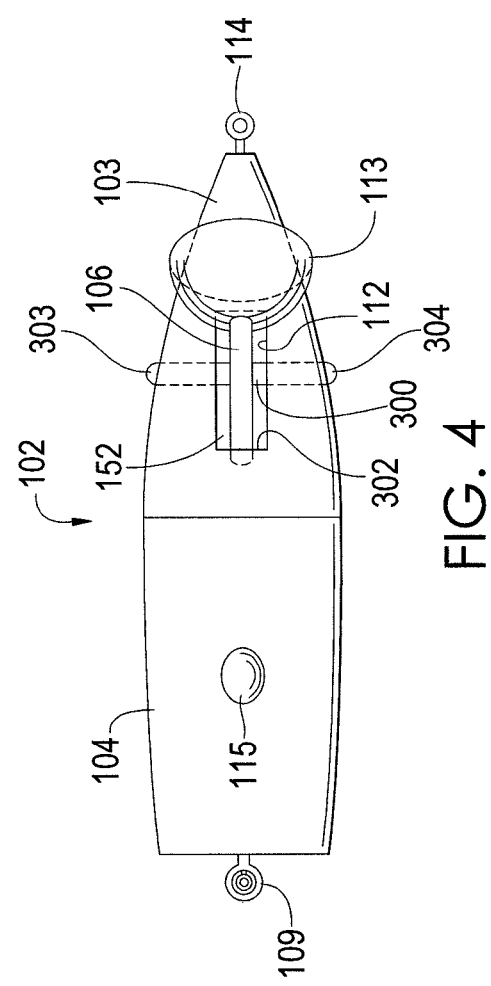

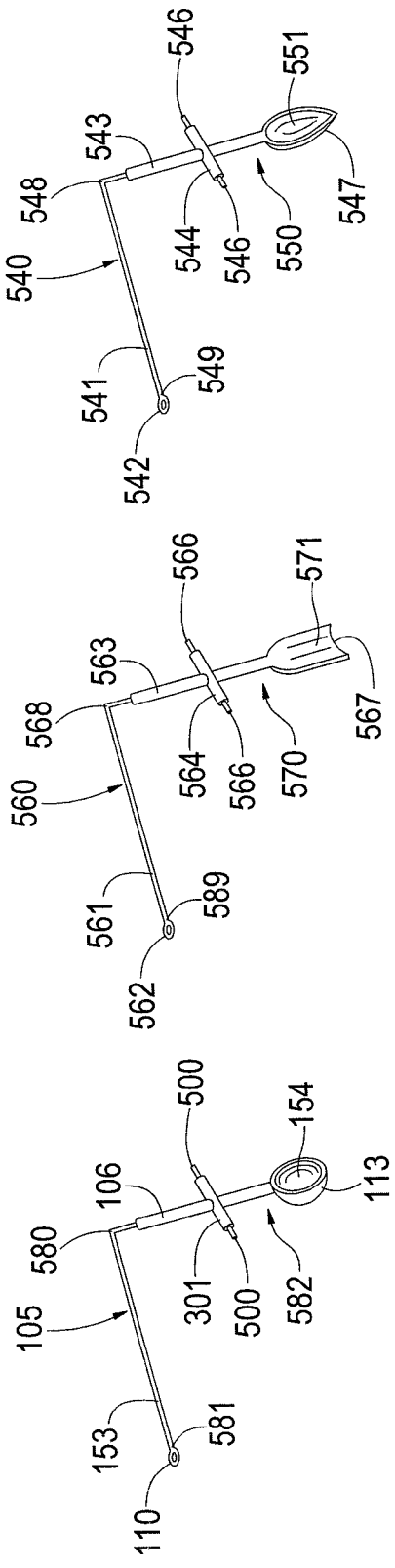
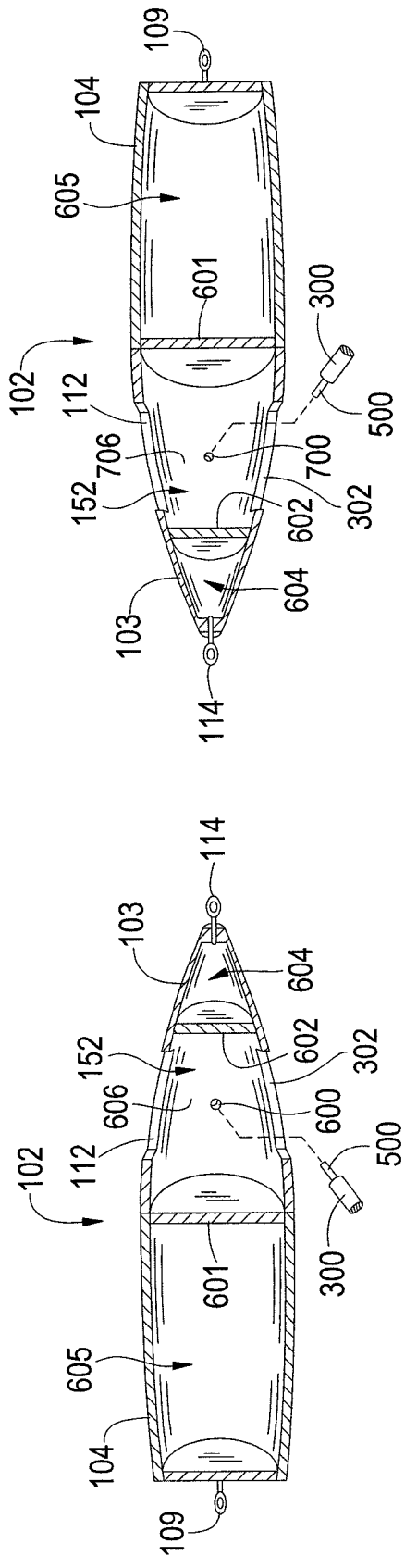

FISHING APPARATUS

CROSS REFERENCE TO RELATED APPLICATIONS

This application claims priority to U.S. Provisional Application Ser. No. 61/214,630 entitled "A Mechanical Fishing Bobber," filed Apr. 27, 2009, which is incorporated herein by reference.

BACKGROUND

There are a variety of different types of fishing techniques. Some fishing techniques include, but are not limited to line fishing, hand fishing, bow fishing, dredging, kite fishing, and ice fishing. One of the most popular of these types of fishing is line fishing.

In line fishing, oftentimes referred to as "angling," a fisherman uses a fishing rod. The rod is laced with fishing line, and at the end of the line are bait and a hook. The fisherman casts the bait and hook attached to the fishing line into a body of water. The fisherman attempts to get a fish to bite the hook, thereby catching a fish.

There are various types of tackle that the fisherman can use in order to increase his/her chances of catching a fish when line fishing. For example, the fisherman may couple a weight or weights to the fishing line between the pole and the hook. Such a weight is oftentimes referred to as a "sinker." The sinker aids in casting the hook and keeps any bait that is coupled to the hook under the water.

Another type of tackle is a bobber or a float. A bobber or a float is also coupled to the fishing line between the pole and the hook. The bobber or float floats atop the water, and the fisherman can change the depth of the bait and the hook by moving the bobber or the float up or down on the fishing line.

SUMMARY

A bobber in accordance with an exemplary embodiment of the present disclosure has a front hollow cavity, a rear hollow cavity, and a middle hollow cavity separating the front cavity from the rear cavity, the middle hollow cavity having a first opening in a top portion of the middle hollow cavity and a second opening in a bottom portion of the middle hollow cavity. In addition, the bobber has an arm comprising a first end and a second end, the arm extending through the first opening and the second opening and fixedly connected to the middle hollow cavity, the arm attached at a first end to fishing line such that when water pressure is applied to the second end of the arm extending from the second opening the arm moves vertically causing bait attached to the fishing line to move vertically in a body of water.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 3 is a top view of the bobber depicted in FIG. 1.

FIG. 4 is a bottom view of the bobber depicted in FIG. 1.

FIG. 5a is a perspective view of an exemplary actuating arm of the bobber depicted in FIG. 1.

FIG. 5b is a perspective view of another exemplary actuating arm of the bobber depicted in FIG. 1.

FIG. 5c is a perspective view of another exemplary actuating arm of the bobber depicted in FIG. 1.

FIG. 6 is a cross-sectional view of the bobber of FIG. 1 taken along line A-A of FIG. 3.

FIG. 7 is a cross-sectional view of the bobber of FIG. 1 taken along line B-B of FIG. 3.

DETAILED DESCRIPTION

The present disclosure generally pertains to a bobber that is used for line fishing. The bobber comprises at least two buoyant cavities separated by a hollow cavity that comprises an opening in a top of the bobber and an opening in a bottom of the bobber. The front side of the bobber comprises an eyelet that is coupled to fishing line that is coupled to a fishing pole.

Coupled within the hollow cavity and extending through the opening in the top and the opening in the bottom is a substantially L-shaped arm. Attached to that portion of the L-shaped arm that extends from the bottom of the cavity is a hydraulic component that is moved by operation of water placing pressure on the hydraulic component. Attached to that portion of the L-shaped arm that extends from the top of the cavity is an eyelet.

Fishing line originating from a fishing pole is attached to the bobber. In one embodiment, fishing line is coupled to the eyelet located on the L-shaped arm. In such an embodiment, the fishing line is attached to the eyelet by knotting the fishing line through the eyelet. The fishing line is further threaded through an eyelet coupled to the back side of the bobber. In another embodiment, fishing line is threaded through an eyelet coupled to the front side of the bobber, through the eyelet located on the L-shaped arm, and through the eyelet coupled to the back side of the bobber. In the embodiments, bait and a hook is then attached to an end of the fishing line that is threaded through the eyelet on the back side of the bobber.

During fishing, the bobber and the bait and hook are placed in a body of water. The bait and hook can be weighted such that the bait and hook fall to a particular depth of the water. The exemplary bobber of the present disclosure floats substantially above the bait and hook on top of the body of water.

As the fishing line from the fishing pole that is attached to the front side of the bobber is reeled in or otherwise moved such that it pulls the bobber in a horizontal direction across the top of the body of water, the hydraulic component moves back and forth also in a horizontal direction. Movement of the hydraulic component back and forth horizontally by the pressure of the water acting against the hydraulic component actuates the L-shaped arm. In this regard, the hydraulic component moves horizontally thereby actuating the L-shaped arm in an upward and downward direction. As the L-shaped arm moves upwardly and downwardly, the fishing line attached to the eyelet of the L-shaped arm that is threaded through the eyelet on the back side of the bobber and is coupled to the bait and hook moves upwardly and downwardly causing the bait and hook to move vertically upwardly and downwardly. Thus, fish (not shown) are attracted to the upward and downward motion of the bait and the hook.

Figure 1:
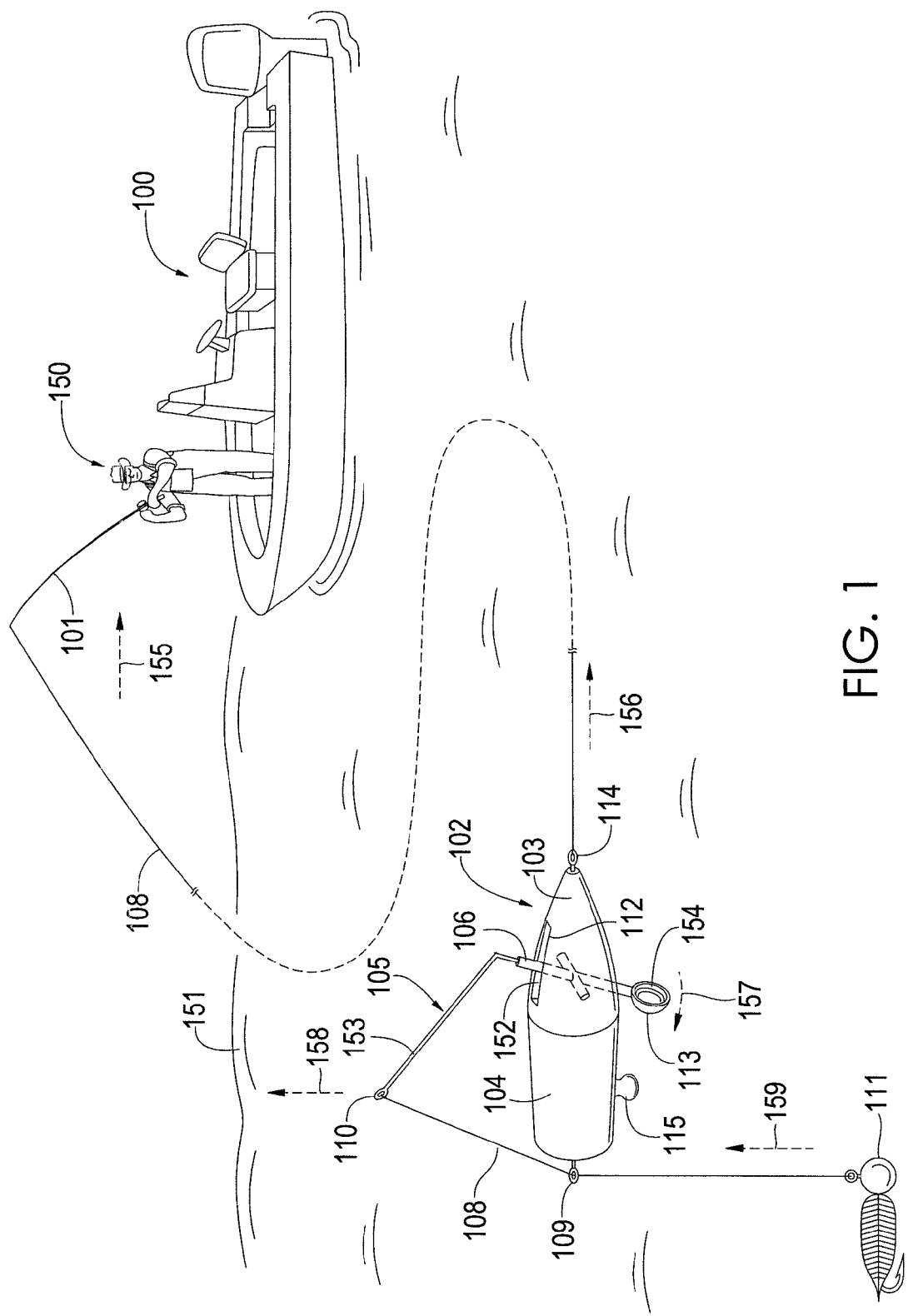
FIG. 1 is a diagram depicting a bobber in a first position in accordance with an exemplary embodiment of the present disclosure.

FIG. 1 depicts a boat 100 and a fishing pole 101 that is held by a fisherman 150. Note that FIG. 1 depicts a position of a bobber 102 in accordance with an embodiment of the present disclosure as the bobber 102 is pulled in a direction indicated by reference arrow 156.

Fishing line 108 is threaded through the fishing pole and extends out to and is connected to a bobber 102. In this regard, the fishing line 108 may be tied to an eyelet 114 on a front end of the bobber 102. Note that FIG. 1 depicts the situation wherein the fishing line and attending tackle has already been cast into a body of water 151.

The bobber 102 comprises a front substantially conical nose portion 103 that is coupled to the eyelet 114. As will be described further herein, the front nose portion 103 is a hollow enclosed cavity that is buoyant. In addition, the bobber 102 comprises a rear substantially cylindrical portion 104. As will be described further herein, the rear substantially cylindrical portion 104 is a hollow enclosed cavity that is also buoyant.

The front substantially conical nose portion 103 is separated from the rear substantially conical portion 104 by a hollow cavity 152. The hollow cavity 152 comprises an opening 112 on a top of the bobber 102 and a corresponding opening (not shown) on a bottom of the bobber 102.

The bobber 102 further comprises an arm 105 that extends through the opening 112 on the top side of the bobber 102 and out the opening on the bottom side of the bobber 102. In one embodiment, the arm 105 is substantially L-shaped. The arm 105 may be other shapes in other embodiments of the present disclosure.

On one end, the arm 105 comprises a bent wire portion 153. On an opposing end, the arm 105 comprises a sleeve 106 that extends through the opening 112 into the hollow cavity 152 and out the opening in the bottom of the bobber 102. The sleeve 106 is coupled to a hydraulic component 113. In the embodiment shown in FIG. 1, the hydraulic component 113 is half-sphere shaped and comprises a cavity 154. However, the hydraulic component 113 may be other shapes in other embodiments of the bobber 102.

The fishing line 108 is attached to the bobber 102. In this regard, coupled to the front end of the bobber 102 is an eyelet 114, coupled to an end opposite the sleeve 106 of the wire portion 153 is an eyelet 110, and coupled to the back end of the bobber 102 is an eyelet 109. In one embodiment, the fishing line 108 is tied to the eyelet 108, and the fishing line 108 is threaded through the eyelet 109, and the fishing line 108 is coupled at its end to bait and hook 111. In another embodiment, the fishing line 108, which originates from the fishing pole 101, is threaded through the eyelet 114, threaded through the eyelet 110, and threaded through the eyelet 109, and the bait and hook 111 is attached to the end of the fishing line 108.

During fishing, the fishing line 108 may be reeled in by the fisherman 150 actuating a reel (not shown) on the fishing pole 101, such that the fishing line moves in a direction indicated by reference arrow 155. Additionally, the fisherman 150 may pull the fishing pole 101 in a direction indicated by reference arrow 155. Whether the fisherman 150 reels in the line 108 or moves the fishing pole 101 in the direction indicated by reference arrow 155, such actions by the fisherman 150 produce a pulling force on the bobber 102. When such pulling force is applied to the bobber 102, the bobber 102 moves in the direction indicated by the reference arrow 156.

As the bobber 102 moves in the direction indicated by reference arrow 156, the cavity 154 of the hydraulic component 113 receives water 151. The water 151 received in the cavity 154 causes pressure on the hydraulic component 113 such that hydraulic component 113 moves in a direction indicated by reference arrow 157. When the hydraulic component 113 moves in the direction indicated by reference arrow 157, such movement translates into vertical movement of the wire portion 153 of the arm 105 in a direction indicated by reference arrow 158. As the arm 105 moves vertically in the direction indicated by reference arrow 158, the bait and hook 111 moves vertically upward in a direction indicated by reference arrow 159.

The bobber 102 further comprises a weight 115 that is attached to the bottom side of the bobber 102. The weight 115 aids in retaining the bobber 102 in a steady position within the body of water.

Figure 2:
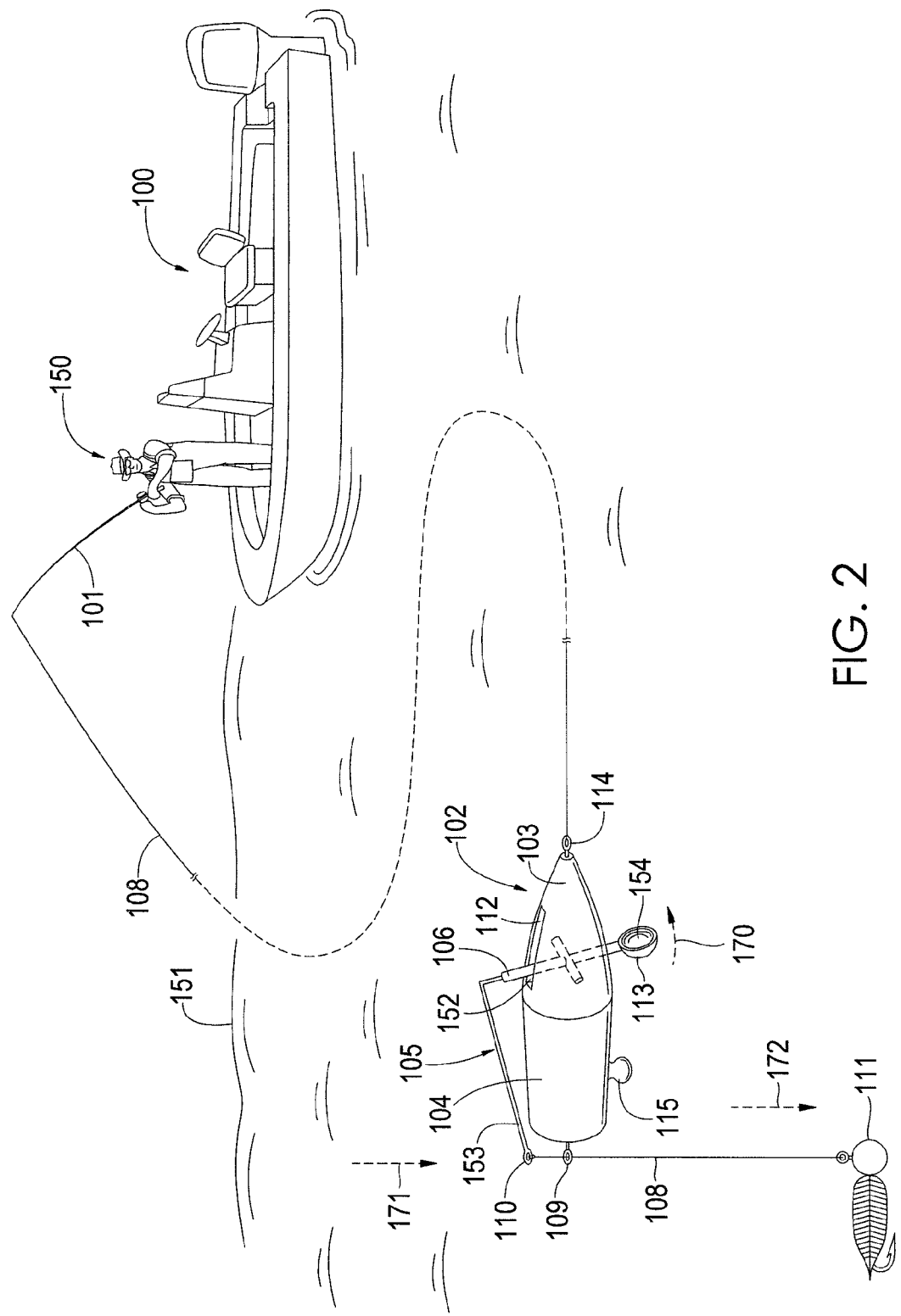
FIG. 2 is a diagram depicting the bobber shown in FIG. 1 in a second position.

FIG. 2 depicts the boat 100 and the fishing pole 101 held by the fisherman 150. Note that FIG. 2 depicts a position of a bobber 102 in accordance with an embodiment of the present disclosure when the bobber 102 is not being pulled in the direction indicated by the reference arrow 156 (FIG. 1) by the fishing line 108.

As described herein, the bobber 102 comprises a front substantially conical nose portion 103 and a rear substantially cylindrical rear portion 104 that are separated by a hollow cavity 152. The arm 105 comprises a wire portion 153 that attaches at a first end via an eyelet 110 to the fishing line 108 that is threaded through the eyelet 109, and the fishing line 108 is attached to the bait and hook 111. The arm 105 further comprises the sleeve 106 and the hydraulic component 113 attached to an opposing end of the arm 105.

During fishing, when the fisherman 150 ceases pulling the fishing line 108 (i.e., when the fisherman stops actuating the reel or stops pulling the fishing pole 101), the fishing line 108 is no longer pulling the bobber 102. When the bobber 102 is no longer being pulled by the fishing line 108 in the direction indicated by reference arrow 156 (FIG. 1), less water pressure being exerted on the cavity 154 of the hydraulic component 113. Thus, the hydraulic component 113 moves in a direction indicated by reference arrow 170. When the hydraulic component 113 moves in a direction indicated by reference arrow 170 in response to no pulling force by the fishing line 108, the arm moves downwardly in a direction indicated by reference arrow 171, which translates into movement of the bait and hook 111 in a vertical downwardly direction indicated by reference arrow 172.

Therefore, with reference to FIGS. 1 and 2, during fishing, the fishing pole 101 can be moved and then not moved. As the fishing pole 101 is moved then not moved, the bait and hook 111 moves upwardly in a direction indicated by reference arrow 159 (FIG. 1) and downwardly in a direction indicated by reference arrow 172.

FIG. 3 depicts a top view of the exemplary bobber 102. As described herein, the bobber 102 comprises a front substantially conical nose portion 103 and a substantially cylindrical rear portion 104 that is separated via a hollow cavity 152. The top of the hollow cavity 152 comprises an opening 112 through which the arm 105 is inserted. Further, the arm 105 comprises the wire portion 153 on a first end of the arm 105 and a hydraulic component 113 on the opposing end of the arm 105. The arm 105 further comprises the sleeve 106 that is attached to the wire portion 153 on a first end and attached to the hydraulic component 113 on a second end.

Attached perpendicularly to either side of the sleeve 106 is a sleeve 300. The sleeve 300 is perpendicularly coupled to the sleeve 106. The sleeves 300 and 106 are substantially hollow, and a metal pin (not shown) is inserted through the sleeve 300 and inserted perpendicularly through the sleeve 106.

Portions of the pin project from the sleeve 300 on either side, and such portions are inserted through openings (not shown) in the side walls of the hollow cavity 152. An epoxy 303 and 304 is placed over the projecting portions of the pin on the outside walls of the hollow cavity 152, thereby fixedly retaining the pin. Thus, as the hydraulic component 113 moves in the directions indicated by reference arrows 157

(FIG. 1) and 170 (FIG. 2), the sleeve 300 rotates about the pin such that the arm 105 moves in the directions indicated by reference arrows 158 (FIG. 1) and 171 (FIG. 2).

FIG. 4 depicts a bottom view of the exemplary bobber 102. As described herein, the bobber 102 comprises the front substantially conical nose portion 103 and a substantially cylindrical rear portion 104 that are separated via the hollow cavity 152. On the bottom of the bobber 102, the hollow cavity 152 comprises an opening 302 through which the sleeve 106 of the arm 105 (FIG. 3) is inserted. Further, the arm 105 comprises the hydraulic component 113 coupled to the sleeve 106 of the arm 105. The sleeve 106 is attached to the wire portion 153 (FIG. 3) on a first end and attached to the hydraulic component 113 on the second end. The sleeve 106 extends through the opening 302 and the hydraulic component 113 juts out from bottom of the bobber 102 from the opening 302.

As described herein, the sleeve 106 is further attached perpendicularly to the sleeve 300. Such sleeve 300 is hollow and a pin (not shown) is inserted through the sleeve 300, perpendicularly through the sleeve 106. Portions of the pin project from the ends of the sleeve 300. The projections of the pin are inserted into openings (not shown) in the side walls of the hollow cavity 152. Epoxy 303 and 304 is applied to the ends of the pin to fixedly retain the pin in the openings of the side walls of the hollow cavity 152, which is described further herein.

FIG. 5a depicts an exemplary arm 105 in accordance with an embodiment of the present disclosure. The arm 105 comprises the wire portion 153 that is bent at point 580 to form an "L." At end 581 is an eyelet 110 for attaching to the fishing line 108 (FIG. 1).

At end 582 is the hydraulic component 113. The exemplary hydraulic component 113 depicted in FIG. 5a is a hollow half-sphere shape having the cavity 154. As the bobber 102 (FIG. 1) is pulled in the horizontal direction indicated by the reference arrow 156 (FIG. 1), water pressure is exerted in the cavity 154, which moves the hydraulic component 113 in the direction indicated by reference arrow 157 (FIG. 1).

The wire portion 153 is coupled to the sleeve 106, which is coupled to the hydraulic component 113. Coupled to the sleeve 106 is the sleeve 300. Inserted through the sleeve 300 and inserted perpendicular to and through the sleeve 106 is a pin 500. Portions of the pin 500 project from both ends of the sleeve 300. Such portions of the pin 500 that project from the sleeve 300 are inserted and fixedly attached to openings (not shown) in side walls (not shown) of the hollow cavity 152, which is described further herein.

FIG. 5b depicts another exemplary arm 560 that may be used in another embodiment of the bobber 102 (FIG. 1). The arm 560 comprises a wire portion 561 that is bent at point 568 to form an "L." At end 589 is an eyelet 562 for attaching to the fishing line 108 (FIG. 1).

At end 570 is a hydraulic component 567. The exemplary hydraulic component 567 shown in FIG. 5b is a slightly concave paddle shape. As the bobber 102 (FIG. 1) is pulled in the horizontal direction indicated by the reference arrow 156 (FIG. 1), water pressure is exerted on the surface 571 of the hydraulic component 567, which moves the hydraulic component 567 in the direction indicated by reference arrow 157 (FIG. 1).

The wire portion 561 is coupled to a sleeve 563, which is coupled to the hydraulic component 567. Coupled to the sleeve 563 is sleeve 564. Inserted through the sleeve 564 and inserted perpendicular to and through the sleeve 563 is a pin 566. Portions of the pin 566 project from the sleeve 564. Such portions of the pin 566 that project from the sleeve 564 are inserted and fixedly attached to openings (not shown) in side walls (not shown) of the hollow cavity 152, which is described further herein.

FIG. 5c depicts another exemplary arm 540 that may be used in another embodiment of the bobber 102 (FIG. 1). The arm 540 comprises a wire portion 541 that is bent at point 548 to form an "L." At end 549 is an eyelet 542 for attaching to the fishing line 108 (FIG. 1).

At end 550 is a hydraulic component 547. The exemplary hydraulic component 547 shown in FIG. 5c is a slightly concave leaf shape. As the bobber 102 (FIG. 1) is pulled in the horizontal direction indicated by the reference arrow 156 (FIG. 1), water pressure is exerted on a surface 551 of the hydraulic component 547, which moves the hydraulic component hydraulic component 547 in the direction indicated by reference arrow 157 (FIG. 1).

The wire portion 541 is coupled to a sleeve 543, which is coupled to the hydraulic component 547. Coupled to the sleeve 543 is sleeve 546. Inserted through the sleeve 546 and inserted perpendicular to and through the sleeve 543 is a pin 546. Portions of the pin 546 project from both ends of the sleeve 546. Such portions of the pin 546 that project from the ends of the sleeve 546 are inserted and fixedly attached to openings (not shown) in side walls (not shown) of the hollow cavity 152, which is described further herein.

FIG. 6 is a cut-away cross-sectional view of the bobber 102 taken along line A-A of FIG. 3. The front substantially conical nose 103 defines a buoyant hollow cavity 604. Additionally, the rear substantially cylindrical portion 104 defines a buoyant hollow cavity 605. Between the substantially conical nose 103 and the rear substantially cylindrical portion 104 is the hollow cavity 152. The hollow cavity 152 is formed in part by a wall 601 that separates the hollow cavity 605 from the hollow cavity 152, a wall 602 that separates the hollow cavity 604 from the hollow cavity 152, and a side wall 606. Note that the hollow cavities 604 and 605 are fully enclosed, whereas the hollow cavity 152 comprises the top opening 112 and the bottom opening 302.

The side wall 606 comprises an opening 600. In this regard, the pin 500 runs through the sleeve 300 and a portion of the pin 500 projects outwardly from the sleeve 300. That portion of the pin 500 that projects from the sleeve 300 is inserted into the opening 600. Epoxy (not shown) is placed over the pin 500 projecting from the outside of the wall 606. That portion of the pin 500 that is inserted into the opening 600 is fixedly coupled to the opening 600 such that the sleeve 300 can rotate about the pin 500 as the hydraulic component 113 (FIG. 1) moves in the direction of the reference arrows 157 (FIG. 1) and 170 (FIG. 2).

FIG. 7 is a cut-away cross-sectional view of the bobber 102 taken along line B-B of FIG. 3. The front substantially conical nose 103 defines the buoyant hollow cavity 604. Additionally, the rear substantially cylindrical portion 104 defines the buoyant hollow cavity 605. Between the substantially conical nose 103 and the rear substantially cylindrical portion 104 is the hollow cavity 152. The hollow cavity 152 is formed in part by the wall 601 that separates the hollow cavity 605 from the hollow cavity 152, the wall 602 that separates the hollow cavity 604 from the hollow cavity 152, and a side wall 706. Note that the hollow cavities 604 and 605 are fully enclosed, whereas the hollow cavity 152 comprises a top opening 112 and a bottom opening 302.

The side wall 706 comprises an opening 700. In this regard, the pin 500 runs through the sleeve 300 and a portion of the pin 500 projects outwardly from the sleeve 300. That portion of the pin 500 that projects from the sleeve 300 is inserted into the opening 700. Epoxy (not shown) is placed over the pin

500 projecting from the outside of the wall 706. That portion of the pin 500 that is inserted into the opening 700 is fixedly coupled to the opening 600 such that the sleeve 300 can rotate about the pin 500 as the hydraulic component 113 (FIG. 1) moves in the direction of the reference arrows 157 (FIG. 1) and 170 (FIG. 2).

It should be emphasized that the above-described embodiments of the present disclosure are merely possible examples of implementations and merely set forth for a clear understanding of the principles of an embodiment of the disclosure. Many variations and modifications may be made to the above-described embodiment(s) of the disclosure without departing substantially from the spirit and principles of the embodiments of the disclosure. All such modifications and variations are intended to be included herein within the scope of this disclosure and protected by the following claims.

The invention claimed is:

1. A bobber, comprising:
   a front hollow cavity;
   a rear hollow cavity;
   a middle hollow cavity separating the front cavity from the rear cavity, the middle hollow cavity having a first opening in a top portion of the middle hollow cavity and a second opening in a bottom portion of the middle hollow cavity; and
   an arm comprising a first end and a second end, the arm extending through the first opening and the second opening and fixedly connected to the middle hollow cavity, the arm attached at the first end to fishing line such that when water pressure is applied to the second end of the arm extending from the second opening the arm moves vertically causing bait attached to the fishing line to move vertically in a body of water;
   a second sleeve coupled perpendicularly to the first sleeve;
   a pin that extends through the second sleeve and extends through and perpendicular to the first sleeve,
   wherein the arm comprises a wire portion that is bent to form an "L" shape and a first sleeve contiguous with the wire portion and wherein portions of the pin project from a first end and a second end of the second sleeve.

2. The bobber of claim 1, wherein the middle hollow cavity has a first inner wall having a third opening and a second inner wall having a fourth opening.

3. The bobber of claim 2, wherein the third opening fixedly receives the portion of the pin projecting from the first end of the second sleeve and the fourth opening fixedly receives the portion of the pin projecting from the second end of the second sleeve such that the second sleeve rotates about the pin when water pressure is applied to the hydraulic component.

\* \* \* \* \*